United States Patent
Sheem et al.

(10) Patent No.: US 6,703,166 B1
(45) Date of Patent: Mar. 9, 2004

(54) NEGATIVE ACTIVE MATERIAL SLURRY COMPOSITION FOR RECHARGEABLE LITHIUM BATTERY AND METHOD OF MANUFACTURING NEGATIVE ELECTRODE USING SAME

(75) Inventors: Kyou-Yoon Sheem, Cheonan (KR); Sang-Young Yoon, Cheonan (KR); Sang-Jin Kim, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 09/710,490

(22) Filed: Nov. 10, 2000

(30) Foreign Application Priority Data

Dec. 8, 1999 (KR) ........................................ 1999-55895

(51) Int. Cl.$^7$ ................................................ H01M 4/58
(52) U.S. Cl. ................................ 429/231.8; 429/231.4; 429/232; 429/231.95
(58) Field of Search ........................... 429/215, 231.95, 429/232, 231.8, 231.4

(56) References Cited

U.S. PATENT DOCUMENTS

| | | | |
|---|---|---|---|
| 3,639,176 A | * 2/1972 | Nordblom et al. | ........... 429/206 |
| 6,132,903 A | * 10/2000 | Fujimoto et al. | ....... 429/231.95 |
| 6,150,053 A | * 11/2000 | Murata et al. | ............. 429/188 |
| 6,468,693 B1 | * 10/2002 | Takami et al. | ............. 429/176 |

FOREIGN PATENT DOCUMENTS

| | | | |
|---|---|---|---|
| CA | 2198417 | | 2/1997 |
| CA | 2198417 A | * | 8/1998 |
| JP | 8-45499 | | 2/1996 |
| JP | 8-69797 | | 3/1996 |
| JP | 9-161776 | | 6/1997 |
| JP | 9-245798 | | 9/1997 |
| JP | 11-40150 | | 2/1999 |
| JP | 11-302004 A | * | 11/1999 |
| JP | 2000-243445 | * | 9/2000 |

OTHER PUBLICATIONS

Kalaignan et al., "Electrochemical behaviour of addition agents impregnated in cadmium hydroxide electrodes for alkaline batteries", Journal of Power Sources, vol. 58, 1996, pp. 29–34.*

* cited by examiner

Primary Examiner—Laura Weiner
(74) Attorney, Agent, or Firm—Christie, Parker & Hale, LLP

(57) ABSTRACT

Disclosed is a negative active material slurry composition for a rechargeable lithium battery. The negative active material slurry composition includes a negative active material, a compound and an organic solvent. The compound includes transition metals, alkaline metals, alkaline earth metals and semi-metals. The negative active material slurry composition has long cycle life owing to the compound.

6 Claims, 1 Drawing Sheet

NEGATIVE ACTIVE MATERIAL SLURRY COMPOSITION FOR RECHARGEABLE LITHIUM BATTERY AND METHOD OF MANUFACTURING NEGATIVE ELECTRODE USING SAME

CROSS REFERENCE TO RELATED APPLICATION

This application is based on application No. 99-55895 filed in the Korean Industrial Property Office on Dec. 8, 1999, the content of which is incorporated hereinto by reference.

BACKGROUND OF THE INVENTION (a) Field of the Invention

The present invention relates to a negative active material slurry composition for a rechargeable lithium battery and a method of manufacturing a negative electrode using the same, and more particularly, to a negative active material slurry for a rechargeable lithium slurry composition exhibiting good cycle life characteristics.

(b) Description of the Related Art

Carbonaceous material used as a negative active material for a rechargeable lithium battery are classified into amorphous carbon and crystalline graphite according to the crystallinity of the substance. Crystalline graphite includes artificial graphite and natural graphite. Typical examples of artificial graphite may include mesocarbon fiber (MCF) and mesocarbonmicro beads (MCMB). They are generally used in rechargeable lithium batteries.

The high crystallinity of natural graphite results in good initial discharge capacity, but flake type configuration materials are produced during the pulverizing step, and these flakes cause an irreversible-capacity increase at the edge of the natural graphite. In addition, natural graphite is severely compressed during electrode preparation so that it becomes difficult to absorb an electrolyte into natural graphite, and the lithium ion transferring route is longer than with artificial graphite. Accordingly, natural graphite exhibits inferior cycle life characteristics, particularly high-rate cycle life characteristics, as compared to artificial graphite of globular, fibrous or random configurations.

Japanese Patent Laid-Open No. Hei 11-40150 discloses a method producing a boron-based oxides negative electrode. The boron-based oxide negative electrode exhibits twice the cycle life characteristics of an a SnO metal oxide negative electrode. However, the boron-based oxides such as $B_2O_3$ are glassy and very brittle such that it is difficult to produce a negative electrode using them.

Japanese Patent No. Laid-Open No. Hei. 9-161776 discloses that metal powder such as Cu, Ni or Fe is added to an active material to increase conductivity between the active material particles, and the metal particles have a diameter one-twentieth to one-fifth that of the active material particle size. A battery using the resulting material exhibits improved cycle life characteristics. Furthermore, Japanese Patent Laid-Open No. Hei 9-245798 discloses that metal particles with a diameter of 2 μm or less is added to an active material to increase conductivity between the active material, thereby improving cycle life characteristics. However, conducting agents such as Cu, Ni or Fe with a one-twentieth to one-fifth diameter of the active material particles and a conducting agent with a diameter of 2 μm or less are very expensive. Furthermore, the heavy conducting agent powder tends to separate from the light active material and the conducting agent is precipitated.

Various patents such as Japanese Patent Laid-Open Nos. Hei. 8-45499 and Hei. 8-69797 disclose that copper oxide or silicate is coated on a surface of the graphite active material in the form of small islands using electroless plating to increase conductivity between the active materials. However, this method requires a high cost and additional steps for producing oxides.

SUMMARY OF THE INVENTION

It is an object of the present invention to provide a negative active material slurry composition for a rechargeable lithium battery which can improve cycle life characteristics.

It is another object to provide a method of manufacturing a negative electrode for a rechargeable lithium battery using the active material slurry composition.

These and other objects may be achieved by a negative active material slurry composition for a rechargeable lithium battery. The negative active material slurry composition includes a negative active material, a compound and an organic solvent. The compound includes elements selected from transition metals, alkaline metals, alkaline earth metals or semi-metals.

In order to achieve these objects and others, the present invention provides a method of manufacturing a negative electrode for a rechargeable lithium battery. In this method, a negative active material is mixed with a compound that includes elements selected from transition metals, alkaline metals, alkaline earth metals or semi-metals. The mixture is added to an organic solvent to prepare a negative active material slurry composition, and the resulting product is coated on a current collector. The coated current collector is dried and the dried current collector is pressed.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
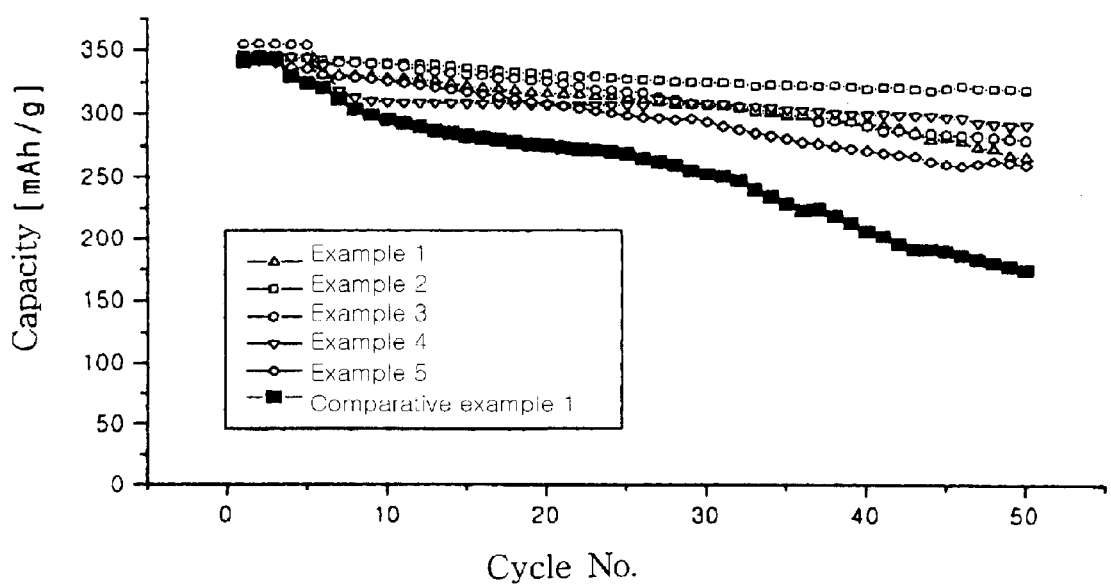
FIG. 1 is a graph showing cycle life characteristics of rechargeable lithium batteries used with the negative active material slurry composition of Examples of the present invention and Comparative Example.

A negative active material slurry composition of the present invention includes a carbonaceous active material, a compound and an organic solvent. The compound includes elements selected from transition metals, alkaline metals, alkaline earth metals or semi-metals.

The transition metals are selected from Mn, Ni, Fe, Cr, Co, Cu or Mo, the alkaline metals are selected from Na or K, the alkaline earth metals are selected from Ca or Mg, and the semi-metals are selected from B, Al, Ga, Si or Sn. The compound thereof may be any compound including the transition metals, the alkaline metals, the alkaline earth metals or the semi-metals. Exemplary thereof are oxides, nitrides, sulfides, hydroxides or chlorides. Preferred are boron compounds, nickel hydroxide, aluminum chloride, aluminumisopropoxide, tin acetate, tin by chloride or an alcohol solution of metal such as calcium oxalate monohydrate or tetraethylene orthosilicate. Most preferred are at least one boron compound such as $B_2O_3$, $H_3BO_3$, $BF_3$.

The negative active material slurry composition of the present invention includes 0.05 to 30 wt % of the transition metals, the alkaline metals, alkaline earth metals or semi-metals. If the amount of the semi-metal is less than 0.05 wt %, the desired effects from adding the semi-metals to the composition are not obtained. Whereas if the amount exceeds 30 wt %, the excess semi-metal may act as an impurity and an adverse effect may be obtained.

The present invention uses the compound of the transition metals, alkaline metals, alkaline earth metals or semi-metals rather than element of those so that the compound thereof presents in the slurry composition. Namely, the compound thereof presents on the surface of the active material, rather than elements. Furthermore, these compounds have water or organic solvent-solubility and have economical advantages owing to the low cost of the compound.

As the negative active material slurry composition of the present invention, amorphous carbonaceous material or crystalline carbonaceous materials may be used. Preferred are crystalline carbonaceous materials because they exhibit voltage flatness. The crystalline carbonaceous material includes natural graphite or artificial graphite, and preferably natural graphite exhibiting an initial discharge capacity. The natural or artificial graphite has a flake, random, disk-type, globular or fibrous configuration. The amorphous carbonaceous material may be soft carbon or hard carbon. The soft carbon is produced by heat-treating coal tar pitch, petroleum pitch, tar, or heavy oil with a low molecular weight at about 1000° C. The hard carbon is produced by heat-treating phenol resin, naphthalene resin, polyvinylalcohol resin, urethane resin, polyimide resin, furan resin, cellulose resin, epoxy resin or polystyrene resin at about 1000° C.

Generally, natural graphite has high crystallinity so that it exhibits good initial discharge capacity. But natural graphite develops a flake configuration when pulverized due to it's high crystallinity, and natural graphite having a flake configuration causes increases in the irreversible capacity at it's edge. In addition, natural graphite is severely compressed during electrode preparation so that it becomes difficult to absorb an electrolyte into it, and the lithium ion transferring route is longer than with artificial graphite. Accordingly, natural graphite exhibits inferior cycle life characteristics, particularly high-rate cycle life characteristics, as compared to artificial graphite with globular, fibrous or random configurations. Due to the above problems, it is difficult to use natural graphite for the negative active material of a rechargeable lithium battery.

In the present invention, a compound including elements such as transition metals, alkaline metals, alkaline earth metals or semi-metals is added to the negative active material slurry composition so that the active material has no edge portion and is not severely compressed. As a result, natural graphite can be used for a rechargeable lithium battery without the above problems.

The organic solvent may be any solvent used in the negative active material slurry composition and the exemplary thereof may be N-methyl pyrrolidone.

The negative active material slurry composition may further include a binder for increasing adhesion between negative active material particles, and between the negative active material and the current collector. The binder is not limited to and may be polyvinylidene fluoride or water-solubility styrene-butadiene rubber. The negative active material slurry composition includes 5 to 10 wt % of the binder.

The negative active material slurry composition of the present invention is produced by mixing a negative active material, a compound, and an organic solvent. The compound includes transition metals, alkaline metals, alkaline earth metals, or semi-metals, and a binder may be added to the mixture. The negative active material slurry composition is coated (cast) on a current collector, which may be but is not limited to copper, to produce a negative electrode. The coated current collector is dried and pressed.

The negative active material slurry composition includes a compound of transition metals, alkaline metals, alkaline earth metals, or semi-metals so that severe compression of the active material may be prevented. Accordingly, the problems due to severe compression, which are electrolyte absorbing difficulty and a long lithium ion transferring route, can be prevented.

Using the negative electrode, a positive electrode and non-aqueous electrolyte, a rechargeable lithium battery is manufactured by the conventional process. The positive electrode is produced by the conventional process known in the related arts, for example by coating a positive active material slurry composition on a current collector and drying. The positive active material slurry composition includes a positive active material, a binder such as polyvinylidene fluoride, and a conductive agent such as carbon black. The current collector may be Al-foil. The positive active material may be any compound used in the rechargeable lithium battery and the exemplary thereof may be transition metal oxides such as $LiCoO_2$, $LiNiO_2$, $LiNi_xCo_{1-x}M_yO_2$ ($0.1<x<1.0$, $0 \leq y \leq 1.0$, M is transition metal), $LiMnO_2$ or $LiMn_2O_4$.

The electrolyte includes organic solvents and lithium salts dissolved in the organic solvent. The organic solvents may be a cyclic carbonate such as ethylene carbonate or methylene carbonate, or a linear carbonate such as dimethyl carbonate, diethyl carbonate, ethylmethyl carbonate or methylpropyl carbonate. The lithium salts may be any lithium salts with the capability of accelerating lithium ion movement between the positive and negative electrodes. The exemplary of lithium salts may be $LiPF_6$, $LiAsF_6$, $LiCF_3SO_3$, $LiN(CF_3SO_2)_3$, $LiBF_6$ or $LiClO_4$.

A solution-type electrolyte may be used, and a solid-type electrolyte such as a gel-type electrolyte may also be used. The solid-type electrolyte is produced by immersing the electrolyte into a polymer film and evaporating the solvent. The solid-type electrolyte acts an electrolyte as well as a separator, and thus it requires no separator. As a separator, porous polymer film such as polypropylene or, polyethylene may be used.

The present invention is further explained in more detail with reference to the following examples.

EXAMPLE 1

5 wt % of $B_2O_3$ was added to 85 wt % of natural graphite negative active material with a flake configuration to prepare a negative active material mixture.

10 wt % of a polyvinylidene fluoride binder was dissolved in N-methyl pyrrolidone and the resulting binder solution was mixed with the negative active material mixture to prepare a negative active material slurry composition.

The negative active material slurry composition was cast (coated) on a Cu-foil collector to produce a negative electrode. The negative electrode was dried in an oven at 120° C. and the dried negative electrode was pressed until the density of the electrode including the binder was 1.7 g/cc or more.

Using the negative electrode and a lithium reference electrode, a coin-type lithium half cell was manufactured. At this time, as the electrolyte, $LiPF_6$ in an ethylene carbonate and dimethyl carbonate mixture was used.

EXAMPLE 2

A coin-type lithium half cell was manufactured by the same procedure as in Example 1 except that 3 wt % of nickel hydroxide was added to the natural graphite negative active material and 5 wt % of a water-soluble styrene-butadiene rubber binder was used.

EXAMPLE 3

A coin-type lithium half cell was manufactured by the same procedure as in Example 1 except that 3 wt % of $B_2O_3$ was added to the natural graphite negative active material and 5 wt % of a water-soluble styrene-butadiene rubber binder was used.

EXAMPLE 4

A coin-type lithium half cell was manufactured by the same procedure as in Example 1 except that 3 wt % of calcium oxalate monohydrate was added to the natural graphite negative active material and 5 wt % of a water-soluble styrene-butadiene rubber binder was used.

EXAMPLE 5

A coin-type lithium half cell was manufactured by the same procedure as in Example 1 except that 3 wt % of tetraethylene ortho silicate was added to the natural graphite negative active material.

Comparative Example 1

A coin-type lithium half cell was manufactured by the same procedure as in Example 1 except that $B_2O_3$ was not added to the natural graphite negative active material.

Each of the coin-type lithium half cells of Examples 1 to 5 and Comparative Example 1 was charged and discharged fifty times and then the cycle life was measured. The results are shown in FIG. 1. As shown in FIG. 1, the half cells of Examples 1 to 3 using natural graphite with a flake configuration and a boron compound exhibits better cycle life characteristics than that of Comparative Example 1. Particularly, the cell of Example 2 using the negative active material slurry including the nickel compound exhibits superior cycle life characteristics. Furthermore, the cells of Examples 4 and 5 using an alcohol solution of metal exhibits improved cycle life characteristics by making the solution uniformly distribute the electrolyte on the surface of the active material and between particles thereof.

As described above, the negative active material slurry composition for a rechargeable lithium battery of the present invention exhibits good cycle life characteristics owing to cycle life improved material.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A negative active material slurry for a rechargeable lithium battery comprising a mixture of a carbonaceous negative active material and a compound in an organic solvent, the compound being selected from the group consisting of nitride compounds and chloride compounds, wherein the compound further comprises at least one element selected from the group consisting of transition metals, alkaline metals, alkaline earth metals and semi-metals, wherein the amount of the compound is 0.05 to 30 wt %.

2. The negative active material slurry composition of claim 1 wherein the transition metal is selected from the group consisting of Mn, Ni, Fe, Cr, Co, Cu and Mo, the alkaline earth metal is selected from the group consisting of Ca and Mg, and the semi-metal is selected from the group consisting of B, Al, Ga, Si and Sn.

3. The negative active material slurry composition of claim 1 wherein the compound includes at least one boron compound.

4. A method of manufacturing a negative electrode for a rechargeable lithium battery comprising:

mixing a carbonaceous negative active material with a compound to form a mixture, the compound being selected from the group consisting of nitride compounds and chloride compounds, wherein the compound further comprises at least one element selected from the group consisting of transition metals, alkaline metals, alkaline earth metals and semi-metals, wherein the amount of the compound us 0.05 to 30 wt %;

adding an organic solvent to the mixture;

coating the resulting mixture on a current collector; and drying the coated current collector and pressing the dried current collector.

5. The method of claim 4 wherein the transition metal is selected from the group consisting of Mn, Ni, Fe, Cr, Co, Cu and Mo, the alkaline metal is selected from the group consisting of Na and K, the alkaline earth metal is selected form the group consisting of Ca and Mg, and the semi-metal is selected from the group consisting of B, Al, Ga, Si and Sn.

6. The method of claim 4 wherein the compound includes at least one boron compound.

* * * * *

UNITED STATES PATENT AND TRADEMARK OFFICE
CERTIFICATE OF CORRECTION

| | | |
|---|---|---|
| PATENT NO. | : 6,703,166 C1 | Page 1 of 1 |
| APPLICATION NO. | : 90/011202 | |
| DATED | : May 24, 2011 | |
| INVENTOR(S) | : Kyou-Yoon Sheem | |

It is certified that error appears in the above-identified patent and that said Letters Patent is hereby corrected as shown below:

On the Title Page

(73) Assignee    Delete

"Samsung SDI Co., Ltd, Suwon, Kyungki-Do (KR)"

Insert

-- Samsung SDI Co., Ltd., Suwon-si (KR) --

In the Claims

Column 1, Claim 2, line 40.    Delete "composition"

Column 1, Claim 2, line 42.    After "Mn,"

Insert -- Ni, --

Claim 3 not shown.    Delete "composition"

Column 2, Claim 4, line 24.    After "the"

Insert -- second --

Signed and Sealed this
Eighteenth Day of December, 2012

David J. Kappos
*Director of the United States Patent and Trademark Office*

(12) EX PARTE REEXAMINATION CERTIFICATE (8261st)
United States Patent
Sheem et al.

(10) Number: US 6,703,166 C1
(45) Certificate Issued: May 24, 2011

(54) NEGATIVE ACTIVE MATERIAL SLURRY COMPOSITION FOR RECHARGEABLE LITHIUM BATTERY AND METHOD OF MANUFACTURING NEGATIVE ELECTRODE USING SAME

(75) Inventors: Kyou-Yoon Sheem, Cheonan (KR); Sang-Young Yoon, Cheonan (KR); Sang-Jin Kim, Cheonan (KR)

(73) Assignee: Samsung SDI Co., Ltd, Suwon, Kyungki-Do (KR)

Reexamination Request:
No. 90/011,202, Sep. 1, 2010

Reexamination Certificate for:
Patent No.: 6,703,166
Issued: Mar. 9, 2004
Appl. No.: 09/710,490
Filed: Nov. 10, 2000

(30) Foreign Application Priority Data

Dec. 8, 1999 (KR) ........................................ 1999-55895

(51) Int. Cl.
*H01M 4/02* (2006.01)
*H01M 4/04* (2006.01)
*H01M 4/36* (2006.01)
*H01M 4/50* (2006.01)
*H01M 4/52* (2006.01)
*H01M 4/58* (2006.01)
*H01M 4/62* (2006.01)
*H01M 10/36* (2006.01)

(52) U.S. Cl. .............. 429/231.8; 429/231.95; 429/232; 429/231.4

(58) Field of Classification Search ........................ None
See application file for complete search history.

(56) References Cited

U.S. PATENT DOCUMENTS

| | | | |
|---|---|---|---|
| 6,071,648 A | 6/2000 | Watanabe et al. | |
| 6,150,053 A | 11/2000 | Murata et al. | |
| 6,451,482 B1 | 9/2002 | Watanabe et al. | |

FOREIGN PATENT DOCUMENTS

| | | |
|---|---|---|
| JP | 08-138743 | 5/1996 |
| JP | 09-306541 | 11/1997 |
| JP | 10-003904 | 1/1998 |
| JP | 10-188957 | 7/1998 |
| JP | 11-007944 | 1/1999 |
| JP | 11-191417 | 7/1999 |
| JP | 2001-068114 | 3/2001 |

OTHER PUBLICATIONS

Patent Abstracts of Japan and English machine translation of JP 08–138743 listed above.
Patent Abstracts of Japan and English machine translation of JP 10–003904 listed above.
Patent Abstracts of Japan and English machine translation of JP 2001–068114 listed above.

*Primary Examiner*—Alan Diamond

(57) ABSTRACT

Disclosed is a negative active material slurry composition for a rechargeable lithium battery. The negative active material slurry composition includes a negative active material, a compound and an organic solvent. The compound includes transition metals, alkaline metals, alkaline earth metals and semi-metals. The negative active material slurry composition has long cycle life owing to the compound.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4 and 5 are determined to be patentable as amended.

Claims 3 and 6 were not reexamined.

1. A negative active material slurry for a rechargeable lithium battery comprising a mixture of a carbonaceous negative active material and a compound in an organic solvent, the compound being selected from the group consisting of nitride compounds and chloride compounds, wherein the compound further comprises at least one element selected from the group consisting of transition metals, alkaline metals, alkaline earth metals, and semi-metals, *wherein the nitride compounds comprise at least one first element selected from the group consisting of first transition metals, first alkaline metals, first alkaline earth metals, and first semi-metals and the chloride compounds comprise at least one second element selected from the group consisting of second transition metals, second alkaline metals, second alkaline earth metals, and second semi-metals, the second semi-metals being selected from the group consisting of B, Ga, Si, and Sn, and* wherein the amount of the compound is 0.05 to 30 wt % *on a solvent free basis*.

2. The negative active material slurry composition of claim 1 wherein the *first* transition metal is selected from the group consisting of Mn, Fe, Cr, Co, Cu, and Mo, the *first* alkaline earth metal is selected from the group consisting of Ca and Mg, [and] the *first* semi-metal is selected from the group consisting of B, Al, Ga, Si, and Sn, *the second transition metal is selected from the group consisting of Mn, Ni, Fe, Cr, Co, Cu, and Mo, and the second alkaline earth metal is selected from the group consisting of Ca and Mg*.

4. A method of manufacturing a negative electrode for a rechargeable lithium battery comprising:

mixing a carbonaceous negative active material with a compound to form a mixture, the compound being selected from the group consisting of nitride compounds and chloride compounds, wherein the compound further comprises at least one element selected from the group consisting of transition metals, alkaline metals, alkaline earth metals, and semi-metals, *wherein the nitride compounds comprise at least one first element selected from the group consisting of first transition metals, first alkaline metals, first alkaline earth metals, and first semi-metals and the chloride compound comprise at least one second element selected from the group consisting of second transition metals, second alkaline metals, second alkaline earth metals, and second semi-metals, the semi-metals being selected from the group consisting of B, Ga, Si, and Sn, and* wherein the amount of the compound [us] *is* 0.05 to 30 wt %;

adding an organic solvent to the mixture;

coating the resulting mixture on a current collector; and drying the coated current collector and pressing the dried current collector.

5. The method of claim 4 wherein the *first* transition metal is selected from the group consisting of Mn, Ni, Fe, Cr, Co, Cu, and Mo, the *first* alkaline metal is selected from the group consisting of Na and K, the *first* alkaline earth metal is selected from the group consisting of Ca and Mg, [and] the *first* semi-metal is selected from the group consisting of B, Al, Ga, Si, and Sn, *the second transition metal is selected from the group consisting of Mn, Ni, Fe, Cr, Co, Cu, and Mo, the second alkaline metal is selected from the group consisting of Na and K, and the second alkaline earth metal is selected from the group consisting of Ca and Mg*.

* * * * *